(12) United States Patent
Roh et al.

(10) Patent No.: US 8,190,298 B2
(45) Date of Patent: May 29, 2012

(54) APPARATUS AND METHOD FOR CONTROLLING VOLTAGE AND FREQUENCY IN NETWORK ON CHIP

(75) Inventors: Jin-Woo Roh, Suwon-si (KR); Kang-Min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 588 days.

(21) Appl. No.: 12/288,298

(22) Filed: Oct. 17, 2008

(65) Prior Publication Data

US 2009/0106569 A1    Apr. 23, 2009

(30) Foreign Application Priority Data

Oct. 19, 2007   (KR) .................. 10-2007-0105460

(51) Int. Cl.
*G06F 19/00* (2011.01)
(52) U.S. Cl. .............. 700/286; 370/395.2; 455/181.1
(58) Field of Classification Search .......... 700/286; 370/395.2; 379/222; 713/300, 320; 455/181.1
See application file for complete search history.

(56) References Cited

U.S. PATENT DOCUMENTS

| | | | |
|---|---|---|---|
| 6,876,668 B1 * | 4/2005 | Chawla et al. ............ 370/468 |
| 6,946,984 B2 * | 9/2005 | Rubin et al. ............ 341/141 |
| 6,992,603 B2 | 1/2006 | Ghoneima et al. | |
| 7,033,882 B2 * | 4/2006 | Block et al. ............ 438/238 |
| 7,073,159 B2 | 7/2006 | Tsai et al. | |
| 7,080,267 B2 | 7/2006 | Gary et al. | |
| 7,155,617 B2 | 12/2006 | Gary et al. | |
| 7,174,404 B2 | 2/2007 | Limoges et al. | |
| 7,190,286 B2 | 3/2007 | Ghoneima et al. | |
| 7,200,137 B2 | 4/2007 | Dorr et al. | |
| 7,227,404 B2 | 6/2007 | Mayega et al. | |
| 7,500,124 B2 | 3/2009 | Seo | |
| 7,624,289 B2 * | 11/2009 | Cranford et al. ............ 713/300 |
| 7,864,460 B2 * | 1/2011 | Hino et al. ............ 359/823 |
| 2002/0085552 A1 * | 7/2002 | Tandon ............ 370/389 |
| 2003/0076130 A1 | 4/2003 | Reddy et al. | |
| 2003/0093702 A1 * | 5/2003 | Luo et al. ............ 713/320 |
| 2003/0197632 A1 * | 10/2003 | Rubin et al. ............ 341/141 |
| 2005/0157738 A1 | 7/2005 | Vangal et al. | |
| 2005/0193357 A1 | 9/2005 | Honary et al. | |
| 2005/0223110 A1 | 10/2005 | Honary et al. | |

(Continued)

FOREIGN PATENT DOCUMENTS

KR    101998047263    9/1998

(Continued)

OTHER PUBLICATIONS

Lee et al., A Network-on-chip with 3 Gbps/wire seriailzed On-chip Interconnect Using Adaptive Control Schemes, 2006, Dept. of EE &Cs korea, p. 1-2.*

(Continued)

*Primary Examiner* — Kidest Bahta

(57) ABSTRACT

An apparatus and a method for controlling a power in a Network on Chip (NoC) are provided. The apparatus includes a storage for storing status information of links interconnecting processing elements (PEs), link configuration information for establishing paths between the PEs, and voltage and clock information of the links according to a bandwidth; and a control device for establishing paths between the PEs to transmit data by checking the link configuration information in the storage, and controlling the voltage and the clock of the links by determining the voltage and the clock of the links of the established paths according to a bandwidth required for the data transmission of the PEs.

24 Claims, 11 Drawing Sheets

U.S. PATENT DOCUMENTS

| | | | |
|---|---|---|---|
| 2007/0040601 A1* | 2/2007 | Lee | 327/540 |
| 2007/0113123 A1* | 5/2007 | Crouch et al. | 714/724 |
| 2007/0124607 A1* | 5/2007 | Fuchs | 713/300 |
| 2008/0057896 A1 | 3/2008 | Kim et al. | |

FOREIGN PATENT DOCUMENTS

| | | |
|---|---|---|
| KR | 1019990045025 A | 6/1999 |
| KR | 1020050117788 A | 12/2005 |
| KR | 100721444 B1 | 5/2007 |

OTHER PUBLICATIONS

Tajana et al. Managing power Consumption in network on Chips, IEEE, 2004 p. 96-105.*

Ogras, Varation-Adaptive Feedback Control for Network-on-Chip with Multiple Clock Domains, 2008, Carnegie Mellon University, PA, p. 1-6.*

* cited by examiner

FIG.8A

ACTIVE JOB TABLE

| ORIGIN. PE# | DEST. PE# | BW# | VC PATH# |
|---|---|---|---|
| EMPTY | | | |

LINK STATUS TABLE

TIME < T0

| | STATUS | VDD | CLK | ACC_BW |
|---|---|---|---|---|
| LF1 | INACTIVE | OFF | OFF | 0 |
| LF2 | INACTIVE | OFF | OFF | 0 |
| LF5 | INACTIVE | OFF | OFF | 0 |
| LF6 | INACTIVE | OFF | OFF | 0 |
| LF9 | INACTIVE | OFF | OFF | 0 |
| LF10 | INACTIVE | OFF | OFF | 0 |
| LF12 | INACTIVE | OFF | OFF | 0 |

FIG.8B

JOB ADDITION

| ORIGIN. PE# | DEST. PE# | BW# | VC PATH# |
|---|---|---|---|
| PE1 | PE9 | 20 | 0 |

TIME = T0

| | STATUS | VDD | CLK | ACC_BW |
|---|---|---|---|---|
| LF1 | ACTIVE | 1.0V | 100M | 20 |
| LF2 | ACTIVE | 1.0V | 100M | 20 |
| LF5 | ACTIVE | 1.0V | 100M | 20 |
| LF6 | INACTIVE | OFF | OFF | 0 |
| LF9 | INACTIVE | OFF | OFF | 0 |
| LF10 | ACTIVE | 1.0V | 100M | 20 |
| LF12 | INACTIVE | OFF | OFF | 0 |

FIG.8C

JOB ADDITION

| ORIGIN. PE# | DEST. PE# | BW# | VC PATH# |
|---|---|---|---|
| PE1 | PE9 | 20 | 0 |
| PE2 | PE9 | 30 | 0 |

TIME = T1

| | STATUS | VDD | CLK | ACC_BW |
|---|---|---|---|---|
| LF1 | ACTIVE | 1.0V | 100M | 20 |
| LF2 | ACTIVE | 1.1V | 300M | 20+30=50 |
| LF5 | ACTIVE | 1.1V | 300M | 20+30=50 |
| LF6 | INACTIVE | OFF | OFF | 0 |
| LF9 | INACTIVE | OFF | OFF | 0 |
| LF10 | ACTIVE | 1.1V | 300M | 20+30=50 |
| LF12 | INACTIVE | OFF | OFF | 0 |

TIME = T2

| STATUS | VDD | CLK | ACC_BW |
|---|---|---|---|
| LF1 | ACTIVE | 1.0V | 100M | 20 |
| LF2 | ACTIVE | 1.1V | 300M | 50 |
| LF5 | ACTIVE | 1.1V | 300M | 50 |
| LF6 | ACTIVE | 1.2V | 500M | 60 |
| LF9 | ACTIVE | 1.2V | 500M | 60 |
| LF10 | ACTIVE | 1.1V | 300M | 50 |
| LF12 | ACTIVE | 1.2V | 500M | 60 |

| ORIGIN. PE# | DEST. PE# | BW# | VC PATH# |
|---|---|---|---|
| PE1 | PE9 | 20 | 0 |
| PE2 | PE9 | 30 | 0 |
| PE4 | PE9 | 60 | 1 |

JOB ADDITION

FIG.9A

TIME = T3

| STATUS | VDD | CLK | ACC_BW |
|---|---|---|---|
| LF1 | ACTIVE | 1.0V | 100M | 20 |
| LF2 | ACTIVE | 1.0V | 100M | 50-30=20 |
| LF5 | ACTIVE | 1.0V | 100M | 50-30=20 |
| LF6 | ACTIVE | 1.2V | 500M | 60 |
| LF9 | ACTIVE | 1.2V | 500M | 60 |
| LF10 | ACTIVE | 1.0V | 100M | 50-30=20 |
| LF12 | ACTIVE | 1.2V | 500M | 60 |

| ORIGIN. PE# | DEST. PE# | BW# | VC PATH# |
|---|---|---|---|
| PE1 | PE9 | 20 | 0 |
| ~~PE2~~ | ~~PE9~~ | ~~30~~ | ~~0~~ |
| PE4 | PE9 | 60 | 1 |

JOB DELETION

FIG.9B

TIME = T4

| | STATUS | VDD | CLK | ACC_BW |
|---|---|---|---|---|
| LF1 | INACTIVE | OFF | OFF | 20−20=0 |
| LF2 | INACTIVE | OFF | OFF | 20−20=0 |
| LF5 | INACTIVE | OFF | OFF | 20−20=0 |
| LF6 | ACTIVE | 1.2V | 500M | 60 |
| LF9 | ACTIVE | 1.2V | 500M | 60 |
| LF10 | INACTIVE | OFF | OFF | 20−20=0 |
| LF12 | ACTIVE | 1.2V | 500M | 60 |

| ORIGIN. PE# | DEST. PE# | BW# | VC PATH# |
|---|---|---|---|
| ~~PE1~~ | ~~PE9~~ | ~~20~~ | ~~0~~ | ← JOB DELETION
| PE4 | PE9 | 60 | 1 |

FIG.9C

TIME = T5

| | STATUS | VDD | CLK | ACC_BW |
|---|---|---|---|---|
| LF1 | INACTIVE | OFF | OFF | 0 |
| LF2 | INACTIVE | OFF | OFF | 0 |
| LF5 | INACTIVE | OFF | OFF | 0 |
| LF6 | INACTIVE | OFF | OFF | 60−60=0 |
| LF9 | INACTIVE | OFF | OFF | 60−60=0 |
| LF10 | INACTIVE | OFF | OFF | 0 |
| LF12 | INACTIVE | OFF | OFF | 60−60=0 |

| ORIGIN. PE# | DEST. PE# | BW# | VC PATH# |
|---|---|---|---|
| ~~PE4~~ | ~~PE9~~ | ~~60~~ | ~~1~~ | ← JOB DELETION

FIG.9D

APPARATUS AND METHOD FOR CONTROLLING VOLTAGE AND FREQUENCY IN NETWORK ON CHIP

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Oct. 19, 2007 and assigned Serial No. 2007-105460, the entire disclosure of which is hereby incorporated by reference.

TECHNICAL FIELD OF THE INVENTION

The present invention relates generally to a Network on Chip (NoC) in a system on chip. More particularly, the present invention relates to an apparatus and a method for reducing power consumption to transmit and receive data over a network between processing elements which process the data on the NoC.

BACKGROUND OF THE INVENTION

In accordance with the complexity and variety of systems, the number of processors on one integrated circuit also increases. The processors exchange data using a common bus as shown in FIG. 1.

FIG. 1 illustrates a conventional integrated circuit using a common bus.

When a single integrated circuit includes four processors 100-1 through 100-4 as shown in FIG. 1, the processors 100-1 through 100-4 exchange data using one common bus 120. The integrated circuit controls the processors 100-1 through 100-4 to exchange data by sharing the common bus 120 using an arbiter 110. For example, to transfer data to the second processor 100-2, the first processor 100-1 requests use of the common bus 120 from the arbiter 110.

The arbiter 110 checks status of the common bus 120. Upon determining that the first processor 100-1 can use the common bus 120, the arbiter 110 sends a bus permission signal to the first processor 100-1.

Upon receiving the bus permission signal from the arbiter 110, the first processor 100-1 transfers data to the second processor 100-2 through the common bus 120.

However, when the number of processors on one integrated circuit increases, the integrated circuit is not able to support a bandwidth required by the processors using a single common bus.

To address this problem, research was conducted on a Network on Chip (NoC), which separates a processing block and a communication circuit. Herein, the NoC separates the processing block and the communication circuit as shown in FIG. 2.

FIG. 2 illustrates a conventional NoC of the system on chip.

The NoC of FIG. 2 includes processing elements (PEs) 200-1 to 200-8 which are an on-chip device, network interfaces 210-1 to 210-8 for interconnecting PEs 200 with a network, switches 220-1 to 220-8, and links 230. Herein, links 230, which are bidirectional links, interconnect a network interface 210 with a switch 220 or a switch 220 with another switch 220.

In the NoC structure, the PEs 200 transfer data only in the link selected by the switch 220. For instance, to transfer data from the first PE 200-1 to the fifth PE 200-5, the first switch 220-1 connected to the first PE 200-1 selects the link connected to the fifth switch 220-5. Hence, the first PE 200-1 transfers data to the fifth PE 200-5 through the link between the first switch 220-1 and the fifth switch 220-5.

As above, since the PEs 200 transfer data in the link selected by the switch 220, multiple data can be transmitted at the same time over the non-overlapping links. Therefore, the NoC structure can provide a high transfer bandwidth.

The frequency of the PEs on the NoC is designated according to their task. The PEs have different frequencies respectively. In other words, as the PEs require different frequencies, drawing a single voltage causes unnecessary power consumption. The PEs can reduce power consumption by drawing the optimum voltage based on their required frequency. Also, based on the different operation time, the PEs can lower power consumption by cutting the power supply to non-operating PEs.

However, since the switches in the NoC need to select the link to the destination among their connected links according to the request of the PE, voltage is supplied to all of the links of the NoC at all times. In this situation, unnecessary power consumption is caused by the voltage supplied to links which do not transfer data.

SUMMARY OF THE INVENTION

To address the above-discussed deficiencies of the prior art, it is a primary aspect of the present invention to address at least the above mentioned problems and/or disadvantages and to provide at least the advantages described below. Accordingly, an aspect of the present invention is to provide an apparatus and a method for reducing a power consumption of a network on a Network on Chip (NoC).

Another aspect of the present invention is to provide an apparatus and a method for regulating voltage and frequency of a link according to a communication bandwidth required by processing elements (PEs) on a NoC.

Yet another aspect of the present invention is to provide an apparatus and a method for controlling a voltage of a switch according to an operation of a link of a network on a NoC.

The above aspects are achieved by providing an apparatus for controlling power in a NoC. The apparatus includes a storage for storing status information of links interconnecting PEs, link configuration information for establishing paths between the PEs, and voltage and clock information of the links according to a bandwidth; and a control device for establishing paths between the PEs to transmit data by checking the link configuration information in the storage, and controlling the voltage and the clock of the links by determining the voltage and the clock of the links of the established paths according to a bandwidth required for the data transmission of the PEs.

According to one aspect of the present invention, a method for controlling power in a NoC includes when a PE requests data transmission, confirming a path for the PE to send data; confirming a bandwidth to be processed by links on the confirmed path according to a bandwidth for the data transmission of the PE; and sending control signals to control voltage and clock of the links according to the bandwidth to be processed by the links.

According to another aspect of the present invention, a method for controlling power in a NoC includes when data transmission of PEs is completed, confirming a changed bandwidth of at least one link constituting a network of the NoC according to the completion of the data transmission; and when there exists a link not transmitting data according to the changed bandwidth, sending control signals of voltage and clock to deactivate the corresponding link.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8A to 8C illustrate a table alteration for controlling the power and the clock of a link on the NoC according to an exemplary embodiment of the present invention; and FIGS. 9A to 9D illustrate a table alteration for controlling the power and the clock of a link on the NoC according to another exemplary embodiment of the present invention.

Throughout the drawings, like reference numerals will be understood to refer to like parts, components and structures.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged Network on Chip (NoC).

Exemplary embodiments of the present invention provide a technique for dynamically controlling the voltage and frequency of a link and a switch constituting a network in a Network on Chip (NoC).

Figure 1:
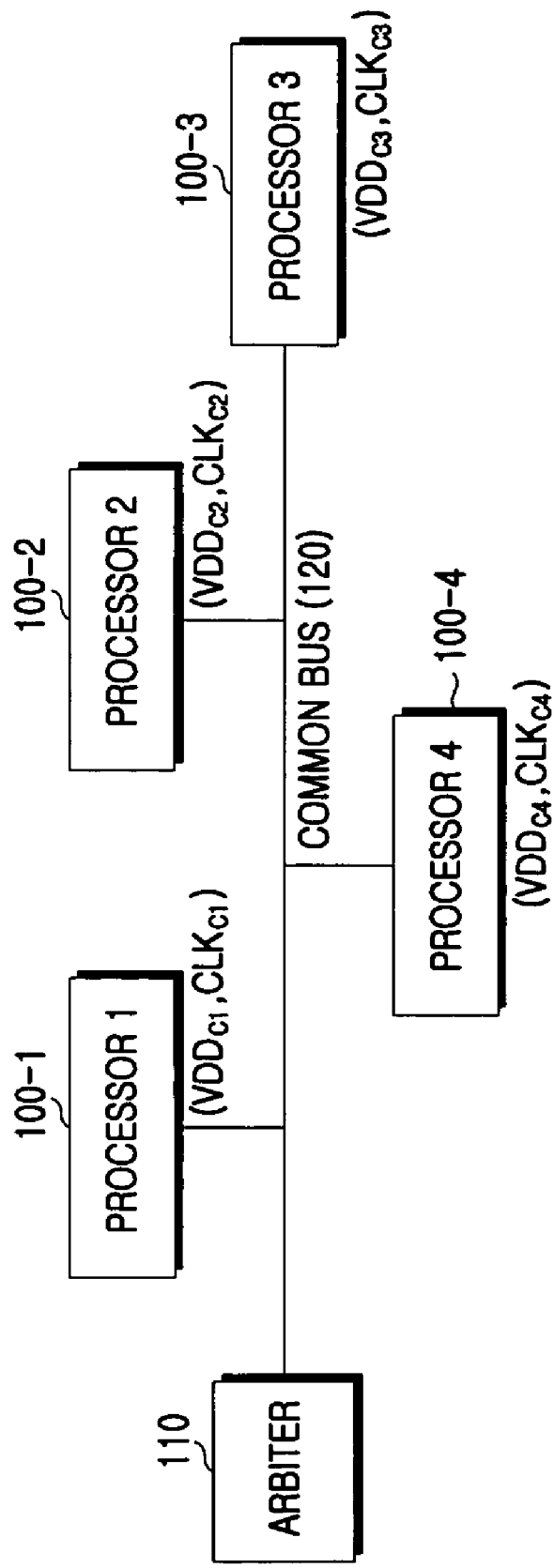
FIG. 1 is a block diagram of a conventional integrated circuit using a common bus.
Figure 2:
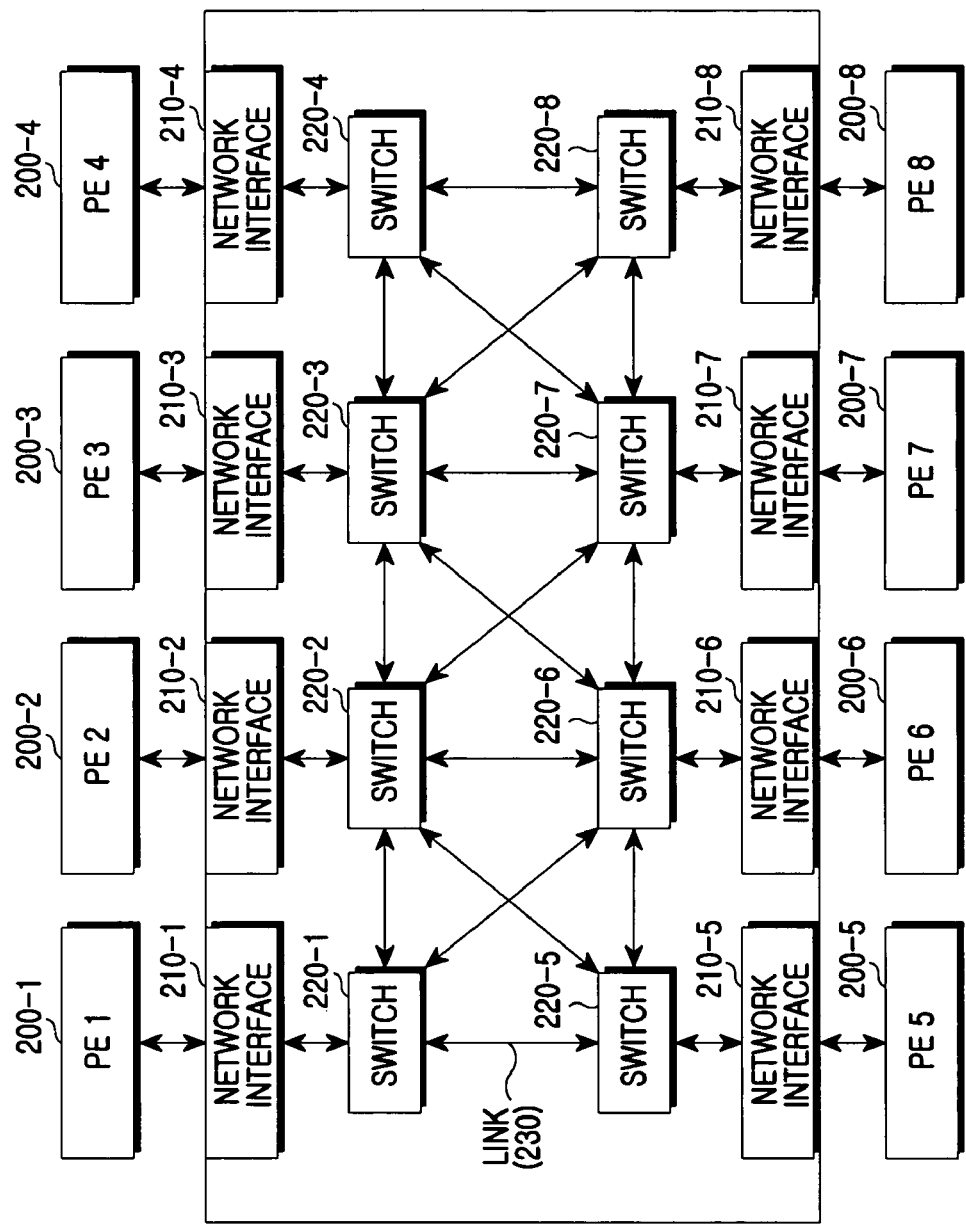
FIG. 2 is a block diagram of a conventional Network on Chip (NoC) of a system on chip.
Figure 3:
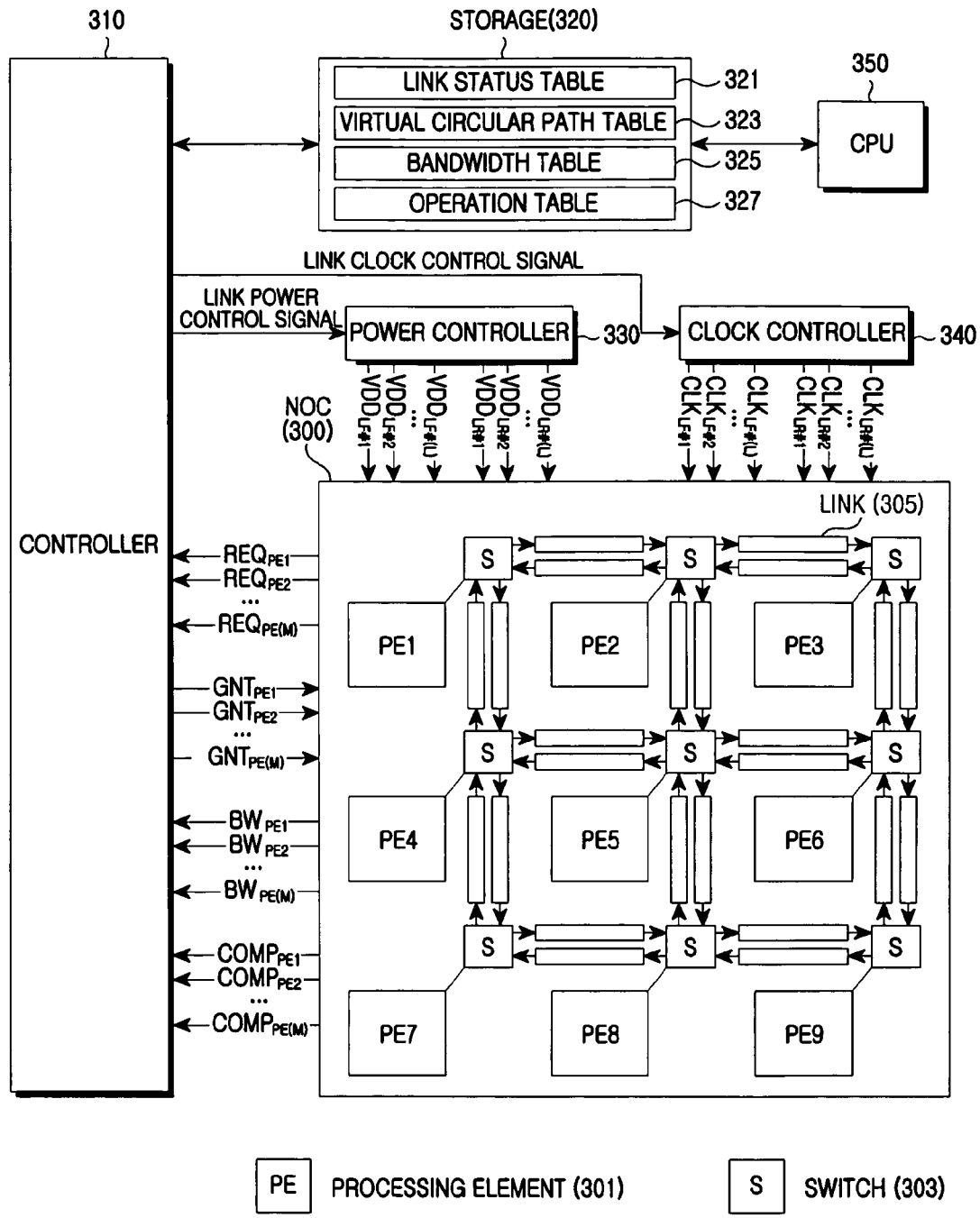
FIG. 3 is a block diagram of a structure for controlling the power and the clock on a NoC according to an exemplary embodiment of the present invention.

To control the voltage and the frequency of links constituting a network on the NoC, the NoC includes modules as shown in FIG. 3.

FIG. 3 is a block diagram of a structure for controlling the power and the clock in the NoC.

To control the power and the clock of the NoC 300, the structure of FIG. 3 includes a controller 310, a storage 320, a power controller 330, a clock controller 340, and a central processing unit (CPU) 350.

The NoC 300 includes processing elements (PEs) 301, switches 303, and links 305. The PEs 301 are connected to a network consisting of the switches 303 and the links 305. Herein, a link 305 is inactive when not transmitting data. Alternatively, the NoC 300 may employ a router in place of the switch 303.

The controller 310 selects paths for the operation of the PEs 301 by referring to tables stored to the storage 320 according to a bandwidth requested by the PEs 301.

The controller 310 sends a control signal to the power controller 330 to control the power of the links 305 constituting the path by referring to the table stored to the storage 320 according to the bandwidth requested by the PEs 301. The controller 310 sends a control signal to the clock controller 340 to control the frequency of the links 305 constituting the path by referring to the tables stored to the storage 320 according to the bandwidth requested by the PEs 301.

The storage 320 stores a link status table 321, a virtual circular path table 323, a bandwidth table 325, and an operation table 327.

The link status table 321 of Table 1 below arranges current status information of links constituting the NoC 300.

TABLE 1

| Link | Status(LF#1) | VDD(LF#1) | CLK(LF#1) | ACC_BW (LF#1) |
|---|---|---|---|---|
| Forward #1 | | | | |
| Link Reverse #1 | Status(LR#1) | VDD(LR#1) | CLK(LR#1) | ACC_BW (LR#1) |
| Link Forward #2 | Status(LF#2) | VDD(LF#2) | CLK(LF#2) | ACC_BW (LF#2) |
| Link Reverse #2 | Status(LR#2) | VDD(LR#2) | CLK(LR#2) | ACC_BW (LR#2) |
| ... | ... | ... | ... | ... |
| Link Forward #L | Status(LF#L) | VDD(LF#L) | CLK(LF#L) | ACC_BW (LF#L) |
| Link Reverse #L | Status(LR#L) | VDD(LR#L) | CLK(LR#L) | ACC_BW (LR#L) |

The link status table 321 includes a link field indicative of the links, a status field indicative of the current status of the links, a voltage (VDD) field indicative of the voltage level currently supplied, a clock (CLK) field indicative of the frequency level (clock) currently supplied, and a bandwidth (ACC_BW) field indicative of the total bandwidth serviced in the current link. Herein, the link status table 321 arranges status information of a forward link and a reverse link of each link. Accordingly, given L-ary links, the link status table 321 includes status information relating to 2L-ary links.

In Table 1, the values of the voltage field, the clock field, and the bandwidth field are used to control the corresponding link only when the status field is 'active'.

The virtual circular path table 323 of Table 2 below arranges possible paths between the PEs 301. Herein, the virtual circular path table 323 can be reconfigured based on the system of the NoC 300.

TABLE 2

| Origin. PE | Dest. PE | Possible VC Paths | | | |
|---|---|---|---|---|---|
| PE#1 | PE#2 | Link_Fwd#1 | | | |
|  | PE#3 | Link_Fwd#1 | Link_Fwd#2 | | |
|  | PE#3 | Link_Fwd#2 | Link_Fwd#3 | | |
|  | PE#5 | Link_Fwd#4 | Link_Fwd#2 | Link_Fwd#3 | |
| PE#2 | PE#1 | Link_Rev#1 | | | |
|  | PE#3 | Link_Fwd#2 | | | |
|  | PE#4 | Link_Fwd#2 | Link_Fwd#3 | | |
|  | PE#9 | Link_Fwd#4 | Link_Fwd#2 | Link_Fwd#3 | Link_Fwd#5 |
| ... | ... | ... | ... | ... | ... |
| PE#9 | PE#1 | Link_Rev#4 | Link_Rev#2 | Link_Rev#3 | |
|  | PE#2 | Link_Rev#4 | Link_Rev#2 | Link_Rev#3 | Link_Rev#5 |

The virtual circular path table 323 includes an origin PE field indicative of the PE sending the data, a destination PE field indicative of the PE receiving data, and a possible virtual circular path field indicative of the links constituting possible paths between the origin PE and the destination PE. For example, possible paths from the PE#1 to the PE#5 include a forward link #4, a forward link #2, and a forward link #3.

Given a plurality of virtual paths between the origin PE and the destination PE, there may be multiple virtual path fields for the same origin PE and the same destination PE. For example, there can be two virtual paths between the PE#1 and the PE#3. Naturally, the PE#1 and the PE#3 includes two virtual circular fields.

The bandwidth table 325 of Table 3 below arranges the voltage and the clock supplied to the link per bandwidth. Herein, the bandwidth table 325 can be reconfigured based on the system of the NoC 300.

TABLE 3

| BandWidth #1 | VDD(BW#1) | CLK(BW#1) |
| BandWidth #2 | VDD(BW#2) | CLK(BW#2) |
| ... | ... | ... |
| BandWidth #B | VDD(BW#B) | CLK(BW#B) |

The bandwidth table 325 includes a bandwidth field indicative of the bandwidth, a voltage (VDD) field indicative of the voltage level of the link to support the corresponding bandwidth, and a clock (CLK) field indicative of the frequency level (clock) of the link to support the corresponding bandwidth.

The operation table 327 of Table 4 below arranges active jobs in the current NoC 300.

TABLE 4

| Origin. PE#1 | Dest.PE#1 | BW#1 | VC Path#1 |
| Origin. PE#2 | Dest.PE#2 | BW#2 | VC Path#2 |
| ... | ... | ... | ... |
| Origin. PE#K | Dest.PE#K | BW#K | VC Path#K |

The operation table 327 includes an origin PE field indicative of the PE sending the data, a destination PE field indicative of the PE receiving data, a bandwidth field indicative of the bandwidth information to transmit data from the origin PE to the destination PE, and a virtual circular path field indicative of the path transmitting data among paths in the virtual circular path table 323. Herein, the virtual circular field includes index information of the path transmitting the current data among the paths in the virtual circular path table 323.

Upon receiving the link power control signal from the controller 310, the power controller 330 controls the power of the corresponding link according to the link power control signal.

Upon receiving the link clock control signal from the controller 300, the clock controller 340 controls the clock of the corresponding link according to the link clock control signal.

As such, the links 305 of the NoC 300 alter the voltage and the frequency according to the intended bandwidth of the PEs 301 under the control of the controller 310. For example, to change the voltage and the frequency under the control of the controller 310, the link 305 is constituted as shown in FIG. 4.

Figure 4:
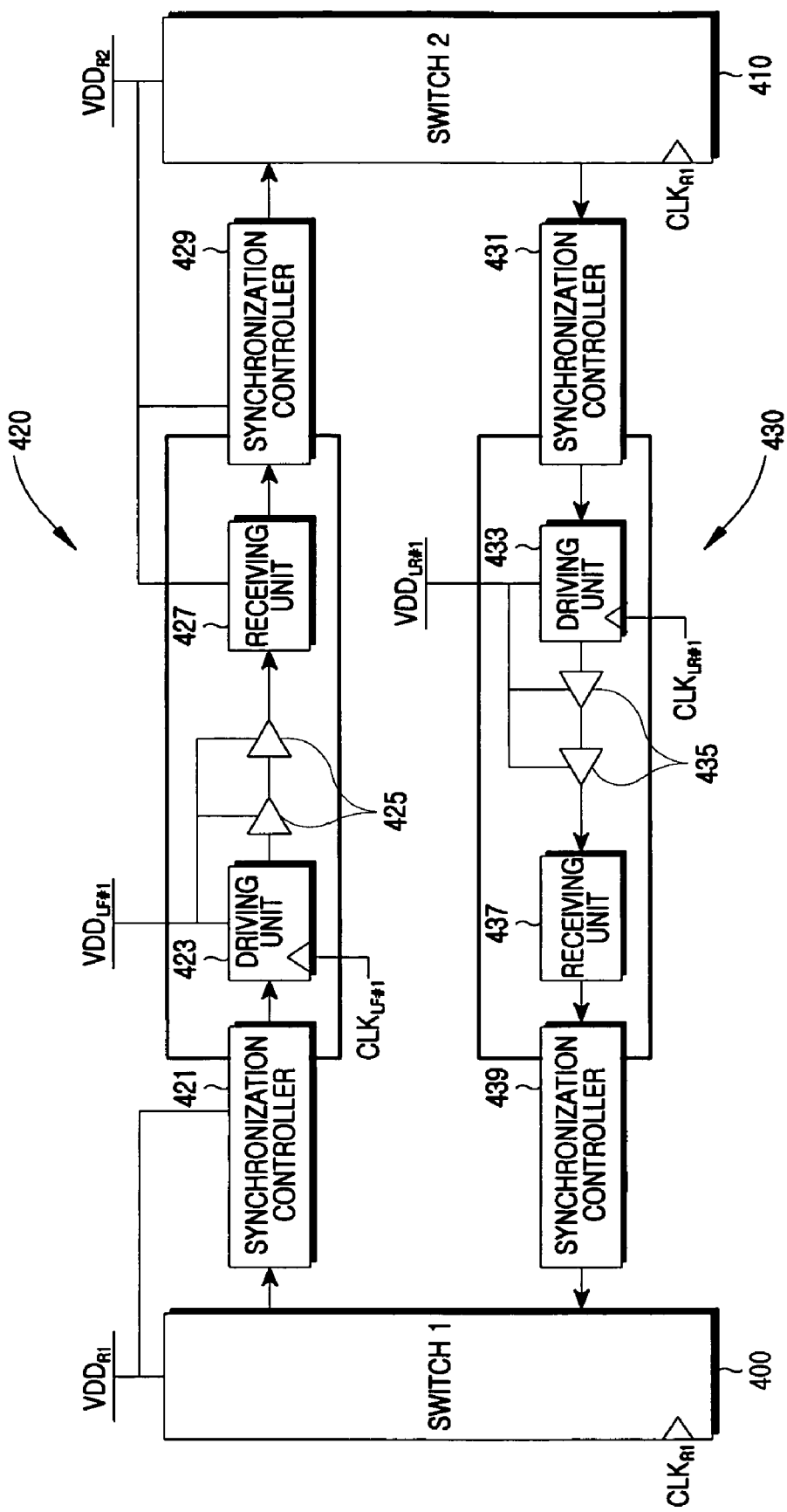
FIG. 4 is a block diagram of a link on the NoC according to an exemplary embodiment of the present invention.

FIG. 4 is a block diagram of the link on the NoC according to an exemplary embodiment of the present invention. While the link between a first switch 400 and a second switch 410 on the NoC 300 is explained by way of example, other links are constituted substantially the same.

The link interconnecting the first switch 400 and the second switch 410 in FIG. 4 includes a forward link 420 and a reverse link 430. Herein, the forward link 420 and the reverse link 430 have merely the different data transfer directions in the same structure. Hence, the forward link 420 is illustrated as a representative.

The forward link 420 includes synchronization controllers 421 and 429, a driving unit 423, a repeater 425, and a receiving unit 427.

When the PEs connected to the first switch 400 and the second switch 410 have different synchronization, the synchronization controllers 421 and 429 match the synchronization of the PEs.

Under the control of the power controller 330 of FIG. 3, the driving unit 423 controls the forward link 420 to operate with the voltage according to the bandwidth to be serviced by the forward link 420. Under the control of the clock controller 340 of FIG. 3, the driving unit 423 controls the forward link 420 to operate in the frequency according to the bandwidth to be serviced by the forward link 420.

The repeater 425 aids the fast signal transmission of the driving unit 423.

The receiving unit 427 converts the clock and the voltage of the data received via the repeater 425 to match the clock level and the voltage level of the driving unit 423. Next, the receiving unit 427 transfers the data to the second switch 410 via the synchronization controller 429.

Now, explanations provide the operations of the controller 310 to set the path according to the bandwidth requested by the PEs 301 and to control the power and the frequency of the links constituting the path.

Figure 5A:
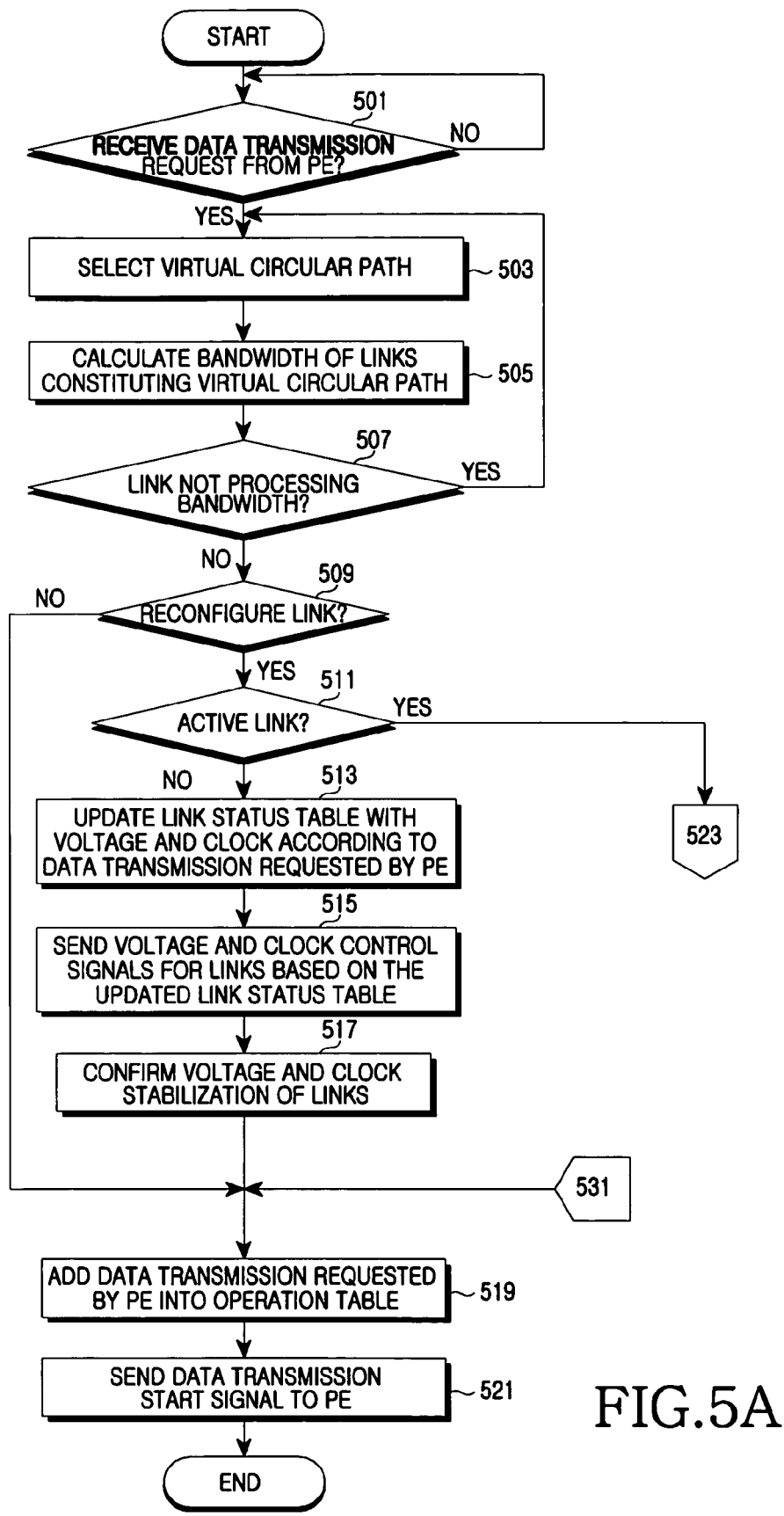
FIGS. 5A and 5B are a flowchart outlining a method for controlling power and clock of links when processing elements (PEs) request data transmission on the NoC according to an exemplary embodiment of the present invention.
Figure 5B:
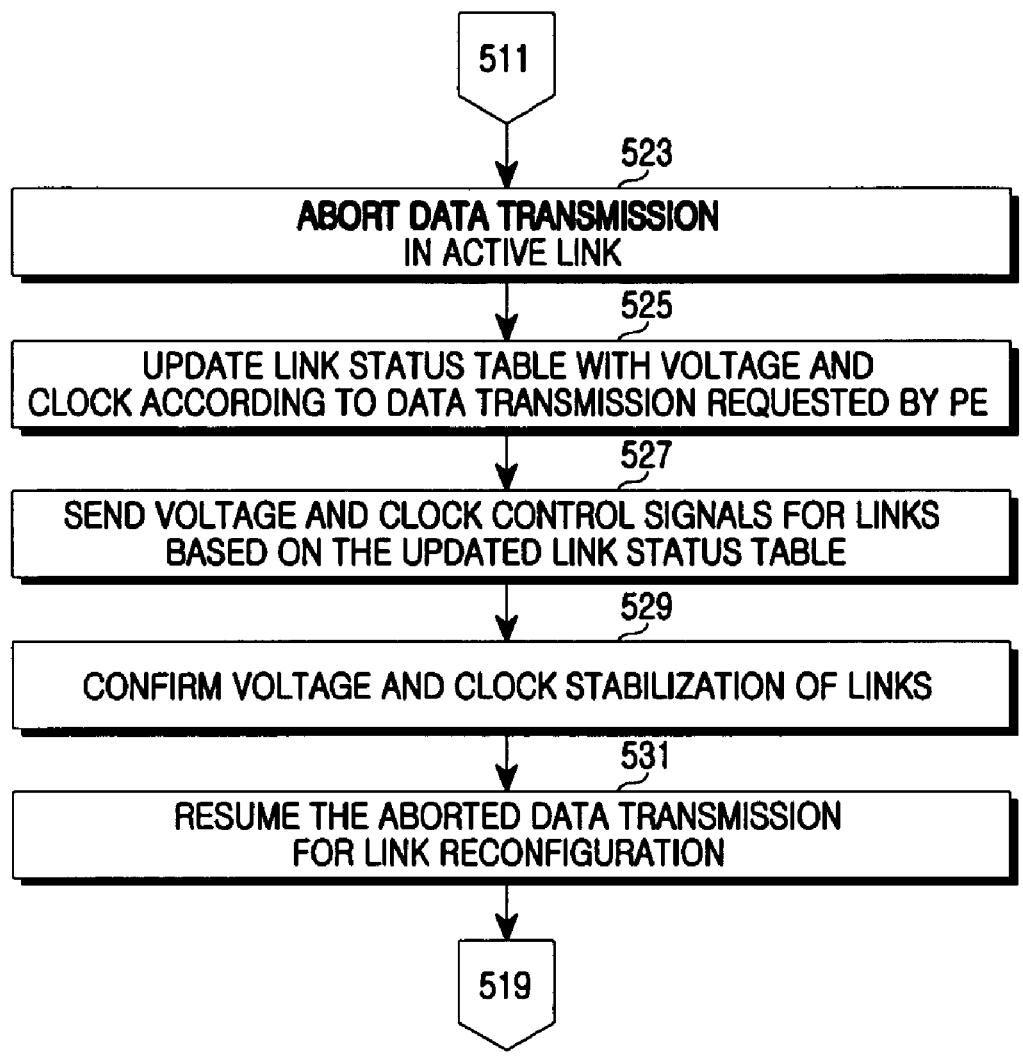

When the PEs 301 request data transmission, the controller 310 establishes a path as shown in FIGS. 5A and 5B and controls the power and the frequency of the links 305 constituting the path.

FIGS. 5A and 5B are a flowchart outlining a method for controlling the power and the clock of links when PEs request data transmission on the NoC according to an exemplary embodiment of the present invention.

In step 501, the controller 310 checks whether a data transmission request signal is received from the PE which requests the data transmission.

Upon receiving the data transmission request signal, the controller 310 selects a virtual path for transmitting data from the origin PE to the destination PE in the virtual circular path table 323 of the storage 320 in step 503. Given a plurality of virtual paths to transmit the data from the origin PE to the destination PE, the controller 310 selects one random path. For example, in the plurality of the virtual paths, the controller 310 sequentially selects the paths according to the virtual path index.

In step 505, the controller 310 calculates a bandwidth to be processed by the links of the virtual circular path. More specifically, the controller 310 calculates the bandwidth to be processed by the links of the virtual circular path by adding the value of the bandwidth field of the corresponding link of the link status table 321 and the bandwidth required for the data transmission requested by the PE.

In step 507, the controller 310 checks whether the links of the virtual circular path are able to process the bandwidth calculated in step 505. Namely, the controller 310 checks whether the bandwidth to be processed by the links in step 505 is less than the greatest bandwidth in the bandwidth table 325.

When any one of the links cannot process the bandwidth calculated in step 505, the controller 310 selects another virtual circular path in step 503.

When the links of the virtual circular path can process the bandwidth calculated in step 505, the controller 310 determines whether to reconfigure the current link to support the virtual circular link in step 509. In other words, for the additional data transmission requested by the PE, the controller 310 checks whether the status, the voltage, and the frequency of the current links are changed or not.

When the current links are not reconfigured, the controller 310 adds the data transmission requested by the PE into the operation table 327 in step 519.

When the current links are reconfigured, the controller 310 checks whether the links of the virtual circular path selected in step 503 includes a currently active link in step 511. That is, the controller 310 checks the status of the links of the virtual circular path selected in step 503 based on the link status table 321.

When all of the links of the virtual circular path are inactive, the controller 310 updates the status, the voltage, the frequency, and the bandwidth of the links of the virtual circular path in the link status table 321 in step 513. For example, the controller 310 confirms the voltage and the clock of the links in the bandwidth table 325 according to the bandwidth, which is calculated in step 505, to be processed by the links. Next, in the link status table 321, the controller 310 changes the status field of the links of the virtual circular path to the active mode, and sets the voltage field and the clock field to the values as confirmed in the bandwidth table 325. The controller 310 sets the bandwidth field of the links of the virtual circular path in the link status table 321 to the bandwidth for the data transmission requested by the PE. Herein, since the links are inactive, the bandwidth calculated for the links in step 505 is the same as the bandwidth for processing the data transmission requested by the PE.

After updating the link status table 321, the controller 310 transmits control signals to control the voltage and the clock of the links of the virtual circular path based on the updated link status table 321 in step 515. In doing so, the controller 310 sends the voltage control signal of the links to the power controller 330, and sends the clock control signal of the links to the clock controller 340.

In step 517, the controller 310 waits for a certain time duration until the voltage and the clock of the links of the virtual circular path are stabilized. Herein, the waiting time until the voltage and the clock of the links are stabilized is adjustable.

In step 519, the controller 310 adds the data transmission requested by the PE into the operation table 327 in step 519.

By contrast, when the links of the virtual circular path includes an active link in step 511, the controller 310 aborts the data transmission of the active link in step 523.

In step 525, the controller 310 updates the status, the voltage, the frequency, and the bandwidth of the links of the virtual circular path in the link status table 321. For example, the controller 310 confirms the voltage and the clock of the links in the bandwidth table 325 according to the bandwidth, which is calculated in step 505, to be processed by the links. Next, the controller 310 changes the status field of the inactive links of the virtual circular path to the active mode in the link status table 321. The controller 310 sets the voltage field and the clock field of the links of the virtual circular path in the link status table 321 to the values as confirmed in the bandwidth table 325. The controller 310 sets the bandwidth field of the links of the virtual circular path in the link status table 321 to the bandwidth computed in step 505.

After updating the link status table 321, the controller 310 transmits control signals to control the voltage and the clock of the links of the virtual circular path based on the updated link status table 321 in step 527. In doing so, the controller 310 sends the voltage control signal of the links to the power controller 330, and sends the clock control signal of the links to the clock controller 340.

In step 529, the controller 310 waits for a certain time duration until the voltage and the clock of the links of the virtual circular path are stabilized. Herein, the waiting time for the stabilization of the voltage and the clock of the links is adjustable.

In step 531, the controller 310 resumes the data transmission aborted in step 523.

Next, the controller 310 adds the data transmission requested by the PE into the operation table 327 in step 519.

In step 521, the controller 310 sends a data transmission start signal (GNT) to the PE.

Next, the controller 310 finishes this process.

Figure 6:
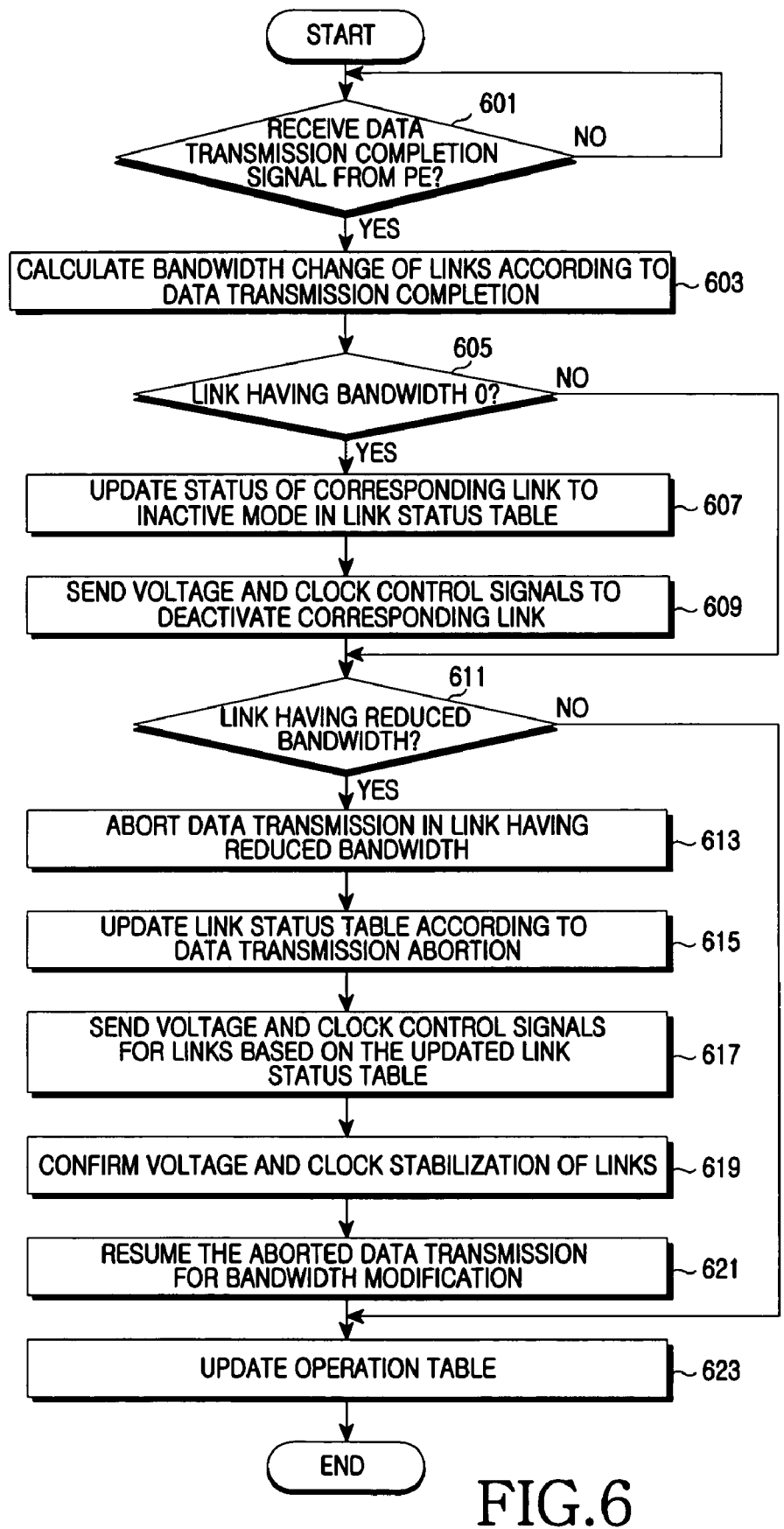
FIG. 6 is a flowchart outlining a method for controlling the power and the clock of links which complete data transmission of the PEs on the NoC according to an exemplary embodiment of the present invention.

When the PEs 301 complete their data transmission, the controller 310 controls the power and the frequency of the links 305 which completed the data transmission as shown in FIG. 6.

FIG. 6 is a flowchart outlining a method for controlling the power and the clock of links which complete data transmission of the PEs on the NoC according to an exemplary embodiment of the present invention.

In step 601, the controller 310 checks whether a data transmission completion signal (Done) is received from the PE.

Upon receiving the data transmission completion signal, the controller 310 calculates a bandwidth change of the links of the completed data transmission in step 603.

In step 605, the controller 310 checks whether there is a link having the bandwidth of '0' among the links of the completed data transmission.

When there is no link having the bandwidth '0', the controller 310 checks whether there exists a link having a reduced bandwidth in step 611.

By contrast, when detecting a link having the bandwidth '0', the controller 310 updates the status field of the corresponding link to the inactive mode in the link status table 321 in step 607.

In step 609, the controller 310 transmits voltage and clock control signals to deactivate the updated link. The controller 310 sends the voltage control signal of the links to the power controller 330 and the clock control signal of the links to the clock controller 340.

In step 611, the controller 310 checks whether there exists a link having a reduced bandwidth due to the data transmission completion.

Detecting no link having a reduced bandwidth, the controller 310 deletes information relating to the completed data transmission in the operation table 327 in step 623.

Detecting a link having a reduced bandwidth, the controller 310 aborts the data transmission in the link having a reduced bandwidth in step 613.

In step 615, the controller 310 updates the voltage, the frequency, and the bandwidth of the links having a reduced bandwidth in the link status table 321. For example, the controller 310 confirms the voltage and the clock of the links in the bandwidth table 325 according to the bandwidth, which is calculated in step 603, to be processed by the links. Next, the controller 310 updates the voltage field and the clock field of the links having the changed bandwidth in the link status table 321 with the values as confirmed in the bandwidth table 325. The controller 310 updates the bandwidth field of the links of the changed bandwidth in the link status table 321 with the bandwidth calculated in step 603.

After updating the link status table 321, the controller 310 transmits control signals to control the voltage and the clock of the links of the changed bandwidth based on the updated link status table 321 in step 617. In doing so, the controller 310 sends the voltage control signal of the links to the power controller 330 and sends the clock control signal of the links to the clock controller 340.

In step 619, the controller 310 waits for a certain time duration until the voltage and the clock of the links of the changed bandwidth are stabilized. Herein, the waiting time for the stabilization of the voltage and the clock of the links is adjustable.

In step 621, the controller 310 resumes the data transmission aborted in step 613.

In step 623, the controller 310 deletes information relating to the completed data transmission from the operation table 327.

Next, the controller 310 finishes this process.

As such, the controller 310 controls the voltage and the clock of the links of the NoC structure using the link status table 321, the virtual circular path table 323, the bandwidth table 325, and the operation table 327 stored to the storage 320. Depending on the data transmission request signal or the data transmission completion signal of the PEs, the controller 310 updates the tables in the storage 320. For instance, when the PEs on the NoC operate as shown in FIG. 7, the controller 310 updates the tables in the storage 320 as shown in FIGS. 8A to 8C and FIGS. 9A to 9D.

Figure 7:
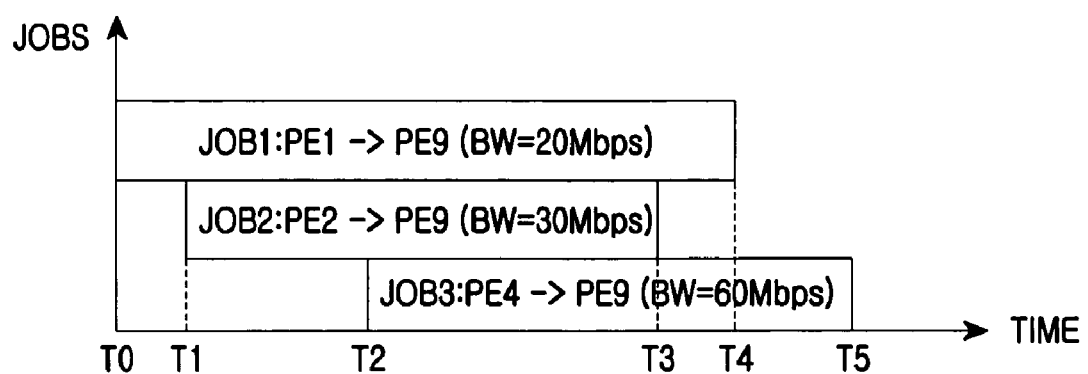
FIG. 7 illustrates a data transmission scenario of the PEs on the NoC according to an exemplary embodiment of the present invention.

FIG. 7 illustrates a data transmission scenario of the PEs on the NoC according to an exemplary embodiment of the present invention.

Among the PEs on the NoC, the PE1 transmits data to the PE9 from the time T0 to the time T5 over the bandwidth of 20 Mbps. The PE2 transmits data to the PE9 from the time T1 to the time T3 over the bandwidth of 30 Mbps. The PE4 transmits data to the PE9 from the time T2 to the time T5 over the bandwidth of 60 Mbps.

In doing so, it is assumed that the bandwidth table 325 is arranged as shown in Table 5 below.

TABLE 5

| BW | VDD | CLK |
|---|---|---|
| BW#1 (10 Mbps) | 1.0 V | 50 MHz |
| BW#2 (20 Mbps) | 1.0 V | 100 MHz |
| BW#3 (30 Mbps) | 1.1 V | 200 MHz |
| BW#4 (50 Mbps) | 1.1 V | 300 MHz |
| BW#5 (100 Mbps) | 1.2 V | 500 MHz |

The bandwidth table 325 includes the voltages and the frequency levels (clocks) to be supplied to the links according to the bandwidth processed by the links. For example, when the link processes a bandwidth of 10 Mbps, the controller 310 controls the link to operate with a voltage of 1.0V and a clock of 50 MHz.

The virtual circular path table 323 is assumed to be arranged as shown in Table 6 below.

TABLE 6

| Origin. PE | Dest. PE | Possible VC Paths | | | |
|---|---|---|---|---|---|
| PE#1 | PE#9 | LF1 | LF2 | LF5 | LF10 |
| | | ... | | | |
| PE#2 | PE#9 | LF2 | LF5 | LF10 | |
| | | ... | | | |
| PE#4 | PE#9 | LF6 | LF7 | LF10 | |
| | PE#9 | LF6 | LF9 | LF12 | |
| | | ... | | | |

The virtual circular path table 323 includes link configuration information included to the possible paths between the origin PE and the destination PE. For example, the path to transmit data from the PE1 to the PE9 includes Link Forward (LF)1, LF2, LF5, and LF10.

Given the bandwidth table 325 of Table 5 and the virtual circular path table 323 of Table 6, the controller 310 arranges the link status table and the operation table as shown in FIGS. 8A to 8C and FIGS. 9A to 9D.

FIGS. 8A to 8C illustrate a table alteration for controlling the power and the clock of a link on the NoC according to an exemplary embodiment of the present invention.

FIG. 8A depicts the link status table and the operation table prior to the time T0, FIG. 8B depicts the link status table and the operation table from the time T0 to the time T1, and FIG. 8C depicts the link status table and the operation table from the time T1 to the time T2.

In FIG. 8A, since the PEs on the NoC do not operate at all before the time T0, the links of the NoC maintain the inactive mode. Accordingly, the status field of every link in the link status table represents the inactive mode and the operation table is empty.

In FIG. 8B, at the time T0, the PE1 transmits data to the PE9 over a bandwidth of 20 Mbps. In the virtual circular path table of Table 6, the path to transmit data from the PE1 to the PE9 includes the LF1, the LF2, the LF5, and the LF10. In the bandwidth table of Table 5, as for the bandwidth of 20 Mbps, the links operate with a voltage of 1.0V and a clock of 100 MHz. Thus, the controller 310 changes the status field of the LF1, the LF2, the LF5, and the LF10 to the active mode in the link status table. The controller 310 sets the voltage field of the LF1, the LF2, the LF5, and the LF10 to 1.0V in the link status table, sets the clock field to 100 MHz, and sets the bandwidth field to 20 Mbps.

The controller 310 adds the job of transmitting the data from the PE1 to the PE9 into the operation table.

In FIG. 8C, at the time T1, the PE1 transmits data to the PE9 over the bandwidth 20 Mbps, and the PE2 transmits data to the PE9 over the bandwidth 30 Mbps. According to the virtual circular path table of Table 6, the path for transmitting data from the PE2 to the PE9 includes the LF2, the LF5 and the LF10. Herein, since the LF2, the LF5, and the LF10 transmit the data from the PE1 to the PE9 and the data from the PE2 to the PE9 at the same time, a bandwidth of 50 Mbps should be processed.

According to the bandwidth table of Table 5, for the bandwidth 50 Mbps, the links operate with a voltage of 1.1V and a clock of 300 Mhz. Accordingly, the controller 310 updates the voltage field of the LF2, the LF5, and the LF10 to 1.1V, updates the clock field to 300 MHz, and updates the bandwidth field to 50 Mbps in the link status table of FIG. 8C.

The controller 310 adds the job of transmitting the data from the PE2 to the PE9 into the operation table.

FIGS. 9A to 9D illustrate a table alteration for controlling the power and the clock of a link on the NoC according to another exemplary embodiment of the present invention.

FIG. 9A depicts the link status table and the operation table from the time T2 to the time T3, FIG. 9B depicts the link status table and the operation table from the time T3 to the time T4, FIG. 9C depicts the link status table and the operation table from the time T4 to the time T5, and FIG. 9D depicts the link status table and the operation table after the time T5.

In FIG. 9A, at the time T2, the PE1 transmits data to the PE9 over the bandwidth 20 Mbps, the PE2 transmits data to the PE9 over the bandwidth 30 Mbps, and the PE4 transmits data to the PE9 over the bandwidth 60 Mbps.

According to the virtual circular path table of Table 6, two paths can transmit data from the PE4 to the PE9. Herein, the path of the index 0 includes the LF6, the LF7, and the LF10. Since the LF10 processes data transmitted from the PE1, the PE2, and the PE4 to the PE9 after the time T2, a bandwidth of 110 Mbps should be processed. Yet, since the link on NoC is able to process the bandwidth of 100 Mbps at maximum, the path of the index 2 is configured to transmit data from the PE4 to the PE9 by including the LF6, the LF9, and the LF12.

For a bandwidth of 60 Mbps in the bandwidth table of Table 5, the links operate with a voltage of 1.2 V and a clock of 500 MHz. The controller 310 changes the status field of the LF6, the LF9, and the LF 12 to the active mode in the link status table as shown in FIG. 9A. In the link status table, the controller 310 updates the voltage field of the LF6, the LF9, and the LF 12 to 1.2V, updates the clock field to 500 MHz, and updates the bandwidth field to 60 Mbps.

The controller 310 adds the job of transmitting the data from the PE4 to the PE9 into the operation Table. Since the job of transmitting the data from the PE4 to the PE9 uses the virtual circular path of the index 1, its virtual path field is set to 1.

In FIG. 9B, at the time T3, the PE1 transmits data to the PE9 over the bandwidth 20 Mbps, the PE4 transmits data to the PE9 over the bandwidth 60 Mbps, and the PE2 finishes the data transfer to the PE9.

When the PE2 completes the data transfer to the PE9, the bandwidth of the LF2, the LF5, and the LF10 is changed from 50 Mbps to 20 Mbps.

Hence, in the link status table of FIG. 9B, the controller 310 updates the voltage field of the LF2, the LF5 and the LF10 to 1.0V, updates the clock field to 100 Mhz, and the updates the bandwidth to 20 Mbps.

The controller 310 deletes the job of transmitting the data from the PE2 to the PE9 in the operation table.

In FIG. 9C, at the time T4, the PE4 transmits data to the PE9 over the bandwidth 60 Mbps, and the PE1 finishes the data transfer to the PE9.

When the PE1 finishes the data transfer to the PE9, the bandwidth of the LF1, the LF2, the LF5 and the LF10 becomes zero.

Thus, the controller 310 updates the status field of the LF1, the LF2, the LF5 and the LF10 to the inactive mode in the link status table of FIG. 9C.

The controller 310 deletes the job of transmitting the data from the PE1 to the PE9 in the operation table.

In FIG. 9D, at the time T5, the PE4 completes the data transfer to the PE9.

When the PE4 completes the data transfer to the PE9, the bandwidth of the LF6, the LF9 and the LF 12 becomes zero.

Hence, the controller 310 updates the status field of the LF6, the LF9 and the LF12 to the inactive mode in the link status table of FIG. 9D.

The controller 310 deletes the job of transmitting the data from the PE4 to the PE9 in the operation table.

As such, the links constituting the network on the NoC structure are active only when there exists the bandwidth required to process the job in order to regulate the voltage and the clock according to the required bandwidth. The switch, which switches the link depending on the PE, operates the same as the links connected to the switch.

In the light of the foregoing, since the network is configured according to the communication bandwidth required by the PEs on the NoC and the voltage and the frequency of the link are dynamically supplied, the power consumption of the network can be reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for controlling a power in a network on chip (NoC), comprising:
    a storage configured to store a status information of one or more links interconnecting a plurality of processing elements (PEs), a link configuration information for establishing paths between the processing elements, and a voltage and a clock information of the one or more links according to a bandwidth; and
    a control device configured to establish paths between the processing elements to transmit a data by checking the link configuration information in the storage, and to control the voltage and the clock of the links by determining a voltage and a clock of the links of the established paths according to a bandwidth required for a data transmission of the processing elements.

2. The apparatus of claim 1, wherein the storage stores the status information of the links by arranging a table which comprises at least one of a field indicative of a status of the links, a field indicative of a voltage level used to transmit data, a field indicative of a frequency level (clock) used to transmit data, and a field indicative of a bandwidth for the data transmission.

3. The apparatus of claim 1, wherein the storage stores the link configuration information for establishing the paths between the processing elements by arranging a table which comprises at least one of a field indicative of an origin processing element which sends data, a field indicative of a destination processing element which receives data, and links on a path interconnecting an origin processing element and a destination processing element.

4. The apparatus of claim 1, wherein the storage stores the voltage and the clock information of the links according to a bandwidth by arranging a table which comprises at least one of a voltage level field of the link configured to support the bandwidth and a frequency level (clock) field of the link configured to support the bandwidth.

5. The apparatus of claim 1, wherein the storage further stores a job information on the network on chip by arranging a table which comprises at least one of a field indicative of an origin processing element which sends data, a field indicative of a destination processing element which receives data, a field indicative of a bandwidth information for transmitting data between an origin processing element and a destination processing element, and a field indicative of paths transmitting data from an origin processing element to a destination processing element.

6. The apparatus of claim 1, wherein the control device controls the voltage and the clock of the links on the path for the data transmission of the processing elements according to a bandwidth required for the processing elements to transmit data by checking a voltage and a clock information of the link based on the bandwidth in the storage, and the control device updates the status information of the links in the storage using the voltage, the clock, and the bandwidth information of the links changed through the controlling.

7. The apparatus of claim 1, wherein the control device comprises:

a controller configured to establish paths between the processing elements using the information stored in the storage, and determine a voltage and a clock to change of the links on the path according to the bandwidth required for the processing elements to transmit data;

a power controller configured to control a voltage of the links under the control of the controller; and a clock controller configured to control a clock of the links under the control of the controller.

8. The apparatus of claim 1, wherein the link comprises:

one or more synchronization parts disposed in proximity to the processing elements and configured to synchronize between the processing elements;

a driving unit configured to control a voltage and a clock of the link under the control of the control device; and a receiving unit configured to convert a voltage and a clock of data received from the driving unit to synchronize a voltage and a clock level with the driving unit.

9. A method for controlling a power in a network on chip (NoC), the method comprising:

when a processing element (PE) requests data transmission, confirming a path for the processing element to send data;

confirming a bandwidth to be processed by one or more links on the confirmed path according to a bandwidth for the data transmission of the processing element; and sending one or more control signals to control a voltage and a clock of the links according to the bandwidth to be processed by the links.

10. The method of claim 9, wherein confirming a bandwidth to be processed by the links comprises:

confirming a bandwidth processed by the links of the path;

confirming a bandwidth required for the data transmission requested by the processing element; and calculating a sum of the bandwidth processed by the links and the bandwidth required for the data transmission requested by the processing element.

11. The method of claim 9, further comprising:

after confirming the bandwidth to be processed by the links, checking whether the links on the path are able to process the confirmed bandwidth; and when at least one of the links is not able to process the bandwidth, confirming another path for the processing element to send the data.

12. The method of claim 11, wherein when the links are able to process the confirmed bandwidth, one or more control signals are transmitted to control a voltage and a clock of the links on the path according to the confirmed bandwidth.

13. The method of claim 9, wherein the sending of the control signals comprises:

checking whether the links on the path comprises an active link;

when there is inactive link, confirming the voltage and the clock of the links on the path for processing the confirmed bandwidth; and sending the control signals to control the voltage and the clock of the links based on the confirmed voltage and clock.

14. The method of claim 13, further comprising:

after confirming the voltage and the clock of the links, updating a status of the links on the path to an active mode in a link status table which arranges status information of the links; and updating the voltage, the clock, and the bandwidth information of the links with the confirmed voltage, clock and bandwidth in the link status table.

15. The method of claim 13, further comprising:

when there exists an active link, aborting a data transmission processed by the active link;

confirming a voltage and a clock of the links on the path for processing the confirmed bandwidth;

sending one or more control signals to control the voltage and the clock of the links according to the confirmed voltage and clock; and resuming the aborted data transmission.

16. The method of claim 15, further comprising:

after confirming the voltage and the clock of the links, updating a status of the inactive links to an active mode in the link status table which arranges the status information of the links; and updating the voltage, the clock, and the bandwidth information of the links with the confirmed voltage, clock and bandwidth in the link status information.

17. The method of claim 9, further comprising:

after sending the control signals, adding a data transmission job requested by the processing element into an operation table which arranges operation information of the processing elements on the network on chip.

18. The method of claim 9, further comprising:

after sending the control signals, controlling the processing element to commence the data transmission.

19. A method for controlling a power in a Network on Chip (NoC), the method comprising:

when data transmission of processing elements (PEs) is completed, confirming a changed bandwidth of at least one link constituting a network of the network on chip according to the completion of the data transmission; and when there exists a link not transmitting data according to the changed bandwidth, sending one or more control signals of voltage and clock to deactivate the corresponding link.

20. The method of claim 19, further comprising:

after sending the control signals, updating a status of links not transmitting data to an inactive mode in a link status table which arranges status information of links.

21. The method of claim 19, further comprises:

after sending the control signals, deleting a job of the completed data transmission in an operation table which arranges operation information of processing elements on the network on chip.

22. The method of claim 19, further comprising:
when there exists a link having a reduced bandwidth according to the changed bandwidth, aborting a data transmission processed by the link having the reduced bandwidth;
confirming a voltage and a clock of the link having the reduced bandwidth according to the reduced bandwidth;
sending one or more control signals to control a voltage and a clock of the link based on the confirmed voltage and clock; and
resuming the aborted data transmission.

23. The method of claim 22, further comprising:
after confirming a voltage and a clock of the links, updating the voltage and the clock of the link with the confirmed voltage, clock and bandwidth in a link status table which arranges status information of links.

24. The method of claim 22, further comprising:
after sending the control signals, deleting a job of the completed data transmission in an operation table which arranges operation information of processing elements on the network on chip.

* * * * *